United States Patent [19]

Bunting et al.

[11] 4,237,339
[45] Dec. 2, 1980

[54] AUDIO TELECONFERENCING

[75] Inventors: John G. Bunting, Ipswich; Robin C. Cross, Felixstowe; David R. Guard; Ian S. Groves, both of Ipswich; Edward G. T. Johnson, Woodbridge; Alan E. Stevens, Ipswich, all of England

[73] Assignee: The Post Office, London, England

[21] Appl. No.: 953,280

[22] Filed: Oct. 18, 1978

[30] Foreign Application Priority Data

Nov. 3, 1977 [GB] United Kingdom ............... 45775/77

[51] Int. Cl.³ .......................... H04M 1/20; H04R 3/02
[52] U.S. Cl. .............................. 179/1 CN; 179/1 DM; 179/1 FS
[58] Field of Search ............... 179/1 CN, 1 FS, 1 AT, 179/1 DM, 1 HF, 1 GA, 1 MF, 1 F, 1 P

[56] References Cited

U.S. PATENT DOCUMENTS

| | | | |
|---|---|---|---|
| 2,263,233 | 11/1941 | Burck | 179/1 FS |
| 3,992,586 | 11/1976 | Jaffe | 179/1 AT |
| 4,078,155 | 3/1978 | Botros et al. | 179/1 CN |

FOREIGN PATENT DOCUMENTS 1002983  9/1965  United Kingdom .................. 179/1 FS

OTHER PUBLICATIONS

R. Botros, "Audio Teleconferencing-The Telephone and the Environment", Telesis, Feb. 1977, pp. 16–21.
G. Sessler & J. West, "Directional Transducers", I.E.E.E. Transactions on Audio and Electroacoustics, vol. AU-19, No. 1, Mar. 1971, pp. 19–23.
E. Jones, "Providing Foldback With Out-Of-Phase Loudspeakers", Journal of the Audio Engineering Society, vol. 19, No. 4, Apr. 1971, pp. 306–309.
H. Tremaine, Audio Cyclopedia, 1977, pp. 174 & 216, Library of Congress Catalog Card No. 77-82885.

*Primary Examiner*—Bernard Konick
*Assistant Examiner*—Randall P. Myers
*Attorney, Agent, or Firm*—Cushman, Darby & Cushman

[57] ABSTRACT

An electro-acoustic terminal unit for use in an audio teleconferencing system comprises a loudspeaker and one or more microphones each having a sensitivity which is directionally dependent and exhibits at least one null or substantially null position. The loudspeaker and microphones are rigidly mounted on a boom and the microphones are so located and orientated relative to the loudspeaker that the null position is directed towards the loudspeaker.

19 Claims, 12 Drawing Figures

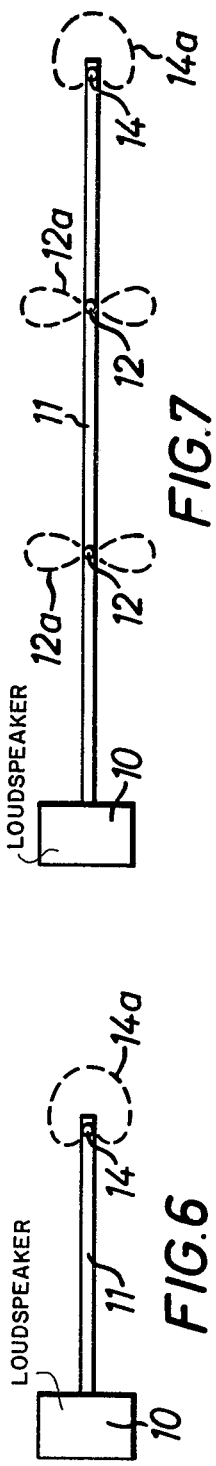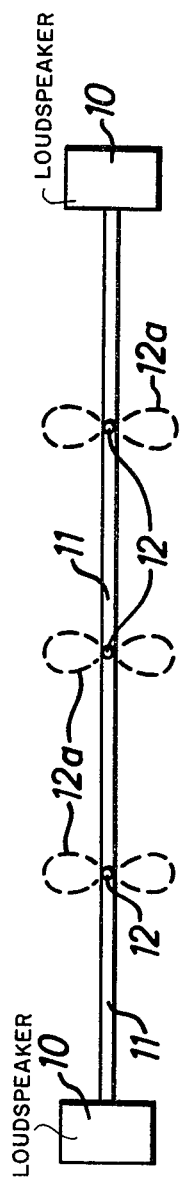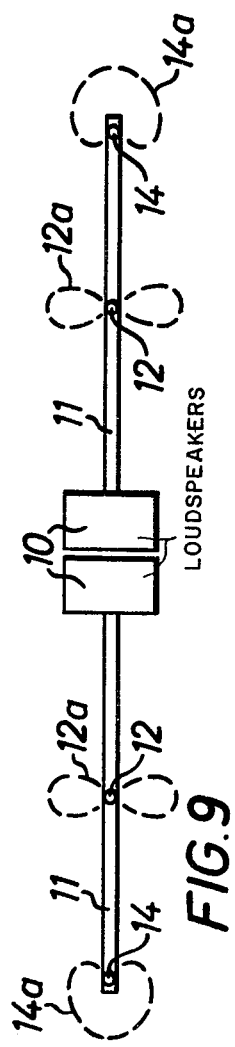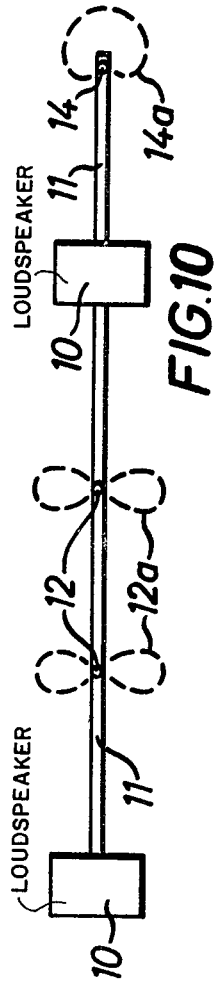

AUDIO TELECONFERENCING

DESCRIPTION

This invention relates to audio teleconferencing and has particular application to an electro acoustic terminal unit for use in an audio teleconferencing system.

Audio teleconferencing allows one or more persons seated around a conference table at a first location to converse with other persons situated at another similar location. Each person or group of persons is provided with a loudspeaker and one or more microphones which are linked by control equipment and a private telephone circuit to loudspeakers and microphones at another location. It is important that an audio teleconferencing system allows all the participants to converse with each other in a natural relaxed manner.

It is known to provide a switched audio teleconferencing system in which each participant to a conference is provided with a manually operable switch to enable him to switch on and off his microphone. Such systems have been found to be unacceptable since they require considerable discipline on the part of each participant. Deep voiced switched systems are also known but these have been found to be undesirable because of clipping of initial consonants when switching and the lack of reaction apparent from a far terminal when one is speaking.

It has been appreciated that it may be possible to overcome these disadvantages if the system does not employ such switching. A prime factor in determining whether or not relaxed discussions can take place with a non-switched system is the loudness of the incoming speech. If the received speech level is not loud enough excessive concentration will be required on the part of the participants or the discussion may break up into two or more distinct meetings, one at each of the locations. A major problem in designing a non-switched system is to achieve acceptable received speech levels without incurring objectional feedback effects such as howl, ringing or colouration of the signal.

It is an object of the present invention to provide a terminal unit for use in a teleconferencing system which enables comfortable listening levels to be achieved without objectional feedback problems for participants taking part in the conference.

The present invention provides a terminal unit for use in an audio teleconferencing system which includes a loudspeaker and one or more microphones, each microphone having a sensitivity which is directionally dependent and exhibits at least one null or substantially null position, the microphone or micorphones being so located and orientated relative to the loudspeaker that the null position is directed towards the loudspeaker.

According to the present invention there is provided an electro acoustic terminal unit for use in an audio teleconferencing system comprising an electro acoustic transducer and one or more acousto-electric transducers each having a sensitivity which is directionally dependent and exhibits at least one null or substantially null position, the acousto-electric transducer or transducers being so located and orientated relative to the electro acoustic transducer that the null position is directed towards the electro acoustic transducer. The electro acoustic transducer may be a loudspeaker and the or each acousto-electric transducer may be a microphone.

In one embodiment a loudspeaker is mounted at one end of a boom and a microphone with a cardioid or figure of eight response curve at the opposite end of the boom. In another embodiment a loudspeaker is mounted at one end of a boom, a microphone with a cardioid response curve at the other end, and one or more microphones each with a figure of eight response curve are mounted on the boom at a position or positions intermediate the loudspeaker and cardioid microphone. Two such arrangements may be provided with the loudspeakers of each arranged back to back adjacent each other.

In an alternative arrangement a loudspeaker is mounted at each end of a boom and one or more microphones each with a figure of eight response are mounted on the boom at positions intermediate the loudspeakers.

Another embodiment has a centrally disposed loudspeaker unit and a plurality of microphones each with a cardioid response, each microphone being mounted on the end of a boom extending radially from the loudspeaker unit.

The terminal equipment may have associated electronic control circuitry connected thereto for feeding signals to and from two telephone lines to provide a 4-wire circuit. The control circuitry may include a transmit channel for feeding signals from the microphones to the line and a receive channel for feeding signals from the line to the loudspeaker.

The or each channel may include a room noise level controlled attenuator whose gain is set in accordance with the room noise level sensed in the vicinity of the terminal equipment.

The invention will be described now by way of example only with particular reference to the accompanying drawings. In the drawings:

FIGS. 6 to 12 show alternative forms of terminal unit.

Figure 1:
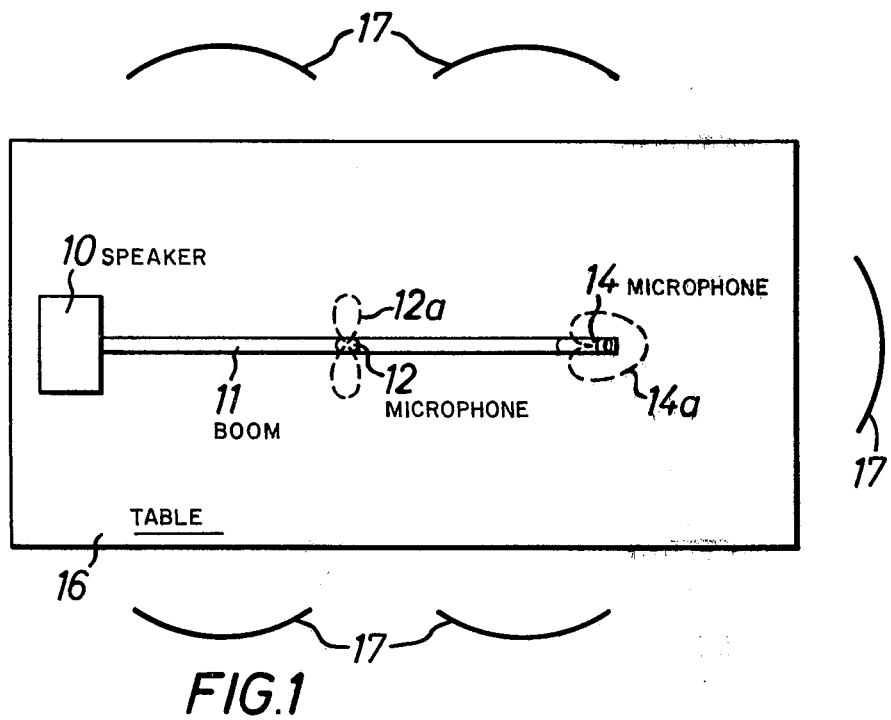
FIG. 1 is a schematic plan illustration of a terminal unit in accordance with the present invention.
Figure 2:
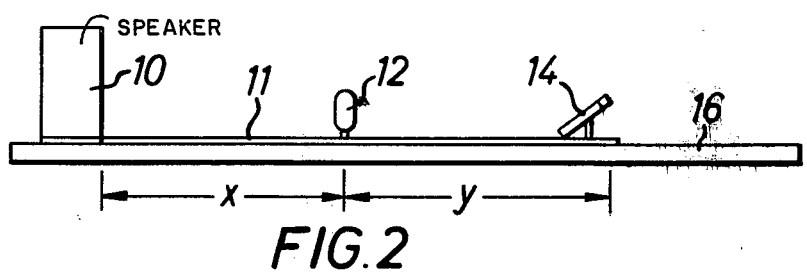
FIG. 2 is a schematic side elevation of a terminal unit.

Referring to FIGS. 1 and 2 an electroacoustic terminal unit for use in an audio teleconferencing system comprises a loudspeaker 10 mounted at one end of a rigid boom 11, a bi-directional microphone 12 mounted on the boom 11 substantially mid-way between its ends and another microphone 14 mounted at the opposite end of the boom 11 to the loudspeaker 10. The loudspeaker 10 and each of the microphones 12 and 14 are connected to an electronic control unit which connects the unit shown in FIGS. 1 and 2 via telephone lines to other similar units at other locations where participants to a conference are situated. The unit is conveniently mounted on a table 16 around which participants to the conference are situated at positions such as those indicated at 17.

The microphone 12 which is positioned closest to the loudspeaker has a bi-directional polar response curve 12a which is substantially in the shape of a figure of eight. The microphone is so positioned that the axis of the figure of eight shape lies substantially perpendicular to the axis of the boom 11 so that the null position of the microphone is directed towards the loudspeaker. This minimises the response of the microphone to sound waves transmitted from the loudspeaker. The second microphone 14 has a polar response curve 14a which is in the shape of a cardioid and the microphone is positioned such that the null of its response curve is directed towards the loudspeaker. The microphones and the loudspeaker are rigidly fixed to the boom 11 so that the loudspeaker and the microphones maintain their relative orientations. Antivibration mountings can be used for the loudspeaker and/or microphones to minimise vibrational feedback to the microphones through the boom 11 or the table top.

The boom 11 can be used to carry cables for the microphones and loudspeaker, the cables terminating in a single multi-way socket at the rear of the loudspeaker plinth. The loudspeaker and microphones can be removably mounted on the boom to allow storage thereof.

The transducers used in the microphones and the loudspeaker are selected to have a flat frequency response and good directional properties so that feedback can be minimised.

In particular the loudspeaker 10 has a flat frequency response in the range 100 Hz to 3.5 kHz and preferably a flat frequency response up to 10 kHz for use with music quality private circuits. The total acoustic energy output as well as the axial frequency response should be frequency independent and in particular the response should not contain any significant peaks.

The bi-directional microphone 12 should have a flat frequency response to diffuse or reverberant sound fields over the range 100 Hz to 3.5 kHz with preferably a flat response up to 10 kHz. For practical microphones a trough is preferable to a peak in the frequency response.

The front to side discrimination should be as large as possible and of the order of 20 dB. The discrimination and the null position should be frequency independent over the range 100 Hz to 3.5 kHz and preferably up to 10 kHz. The front to random index should be as high as possible preferably approaching 4.8 dB.

The microphone 14 should have similar characteristics to the microphone 12 but front to back discrimination should be read instead of front to side discrimination.

In addition to the characteristics and orientation of the microphones their separation from the loudspeaker affects the received speech level. The separation of the bi-directional microphone 12 from the loudspeaker 10 (the distance x in FIG. 2) is selected on the criterion that for typical room conditions the feedback signal received by the microphone from the loudspeaker is 1 dB above that which would be received from the reverberant sound field alone. Calculations for typical room acoustic conditions, microphone front to side discrimination and front to ramdom index indicate that the minimum loudspeaker to bi-directional microphone separation is around 0.4 m. The minimum separation increases as the acoustic environment improves and it has been found that separations of 0.6 to 1.1 can be used with practical sizes of tables.

The separation of the cardioid microphone 14 from the microphone 12 (the distance y in FIG. 2) affects the uniformity of the response of the microphone system to the conferees seated around the table 16. A separation of not more than one table width is acceptable although smaller separations are more satisfactory.

Figure 3:
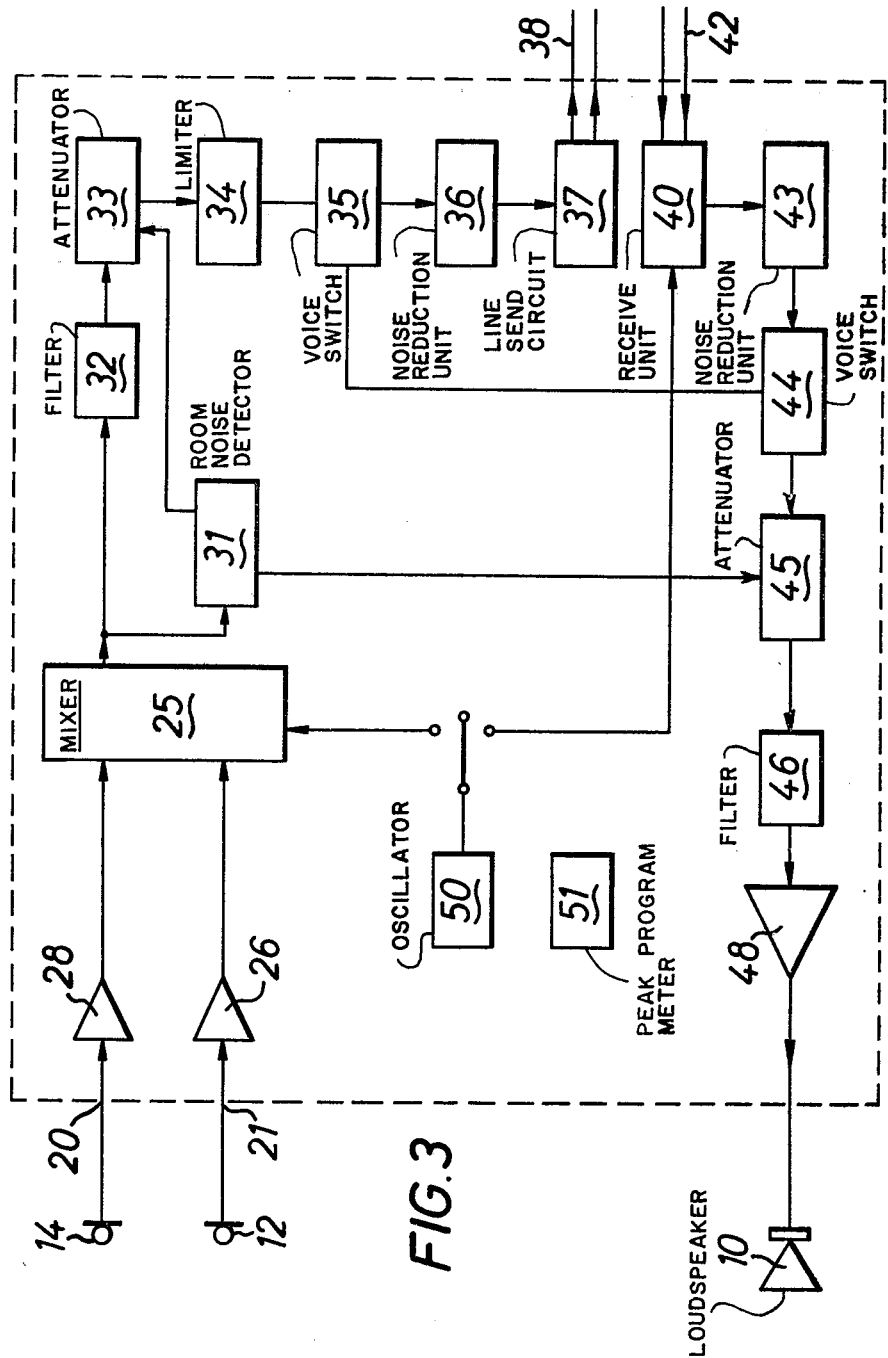
FIG. 3 is a block circuit diagram of electronic control circuitry for the terminal unit shown in FIG. 1.

The electronic circuits used with the unit of FIGS. 1 and 2 are shown in FIG. 3. Four-wire transmission is employed to avoid howl around problems associated with non-adaptive two to four wire conversion in a practical telephone network. The circuits comprise two inputs 20, 21 one for each microphone. The bi-directional microphone 12 is connected to the input 21 and from there to a mixer 25 via an amplifier 26. The cardioid microphone 14 is connected to the input 20 and from there via an amplifier 28 to the mixer 25.

Figure 4:
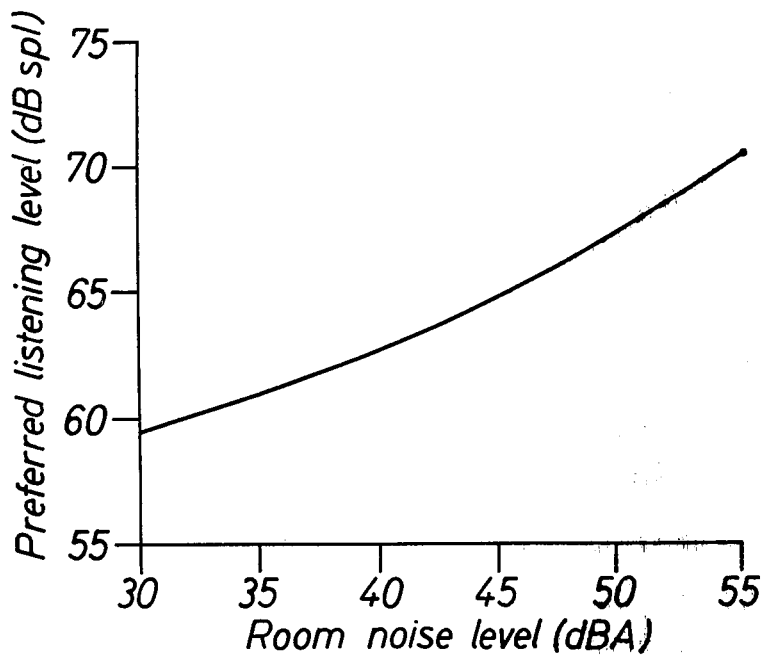
FIG. 4 is a plot of preferred listening level as a function of room noise level.
Figure 5:
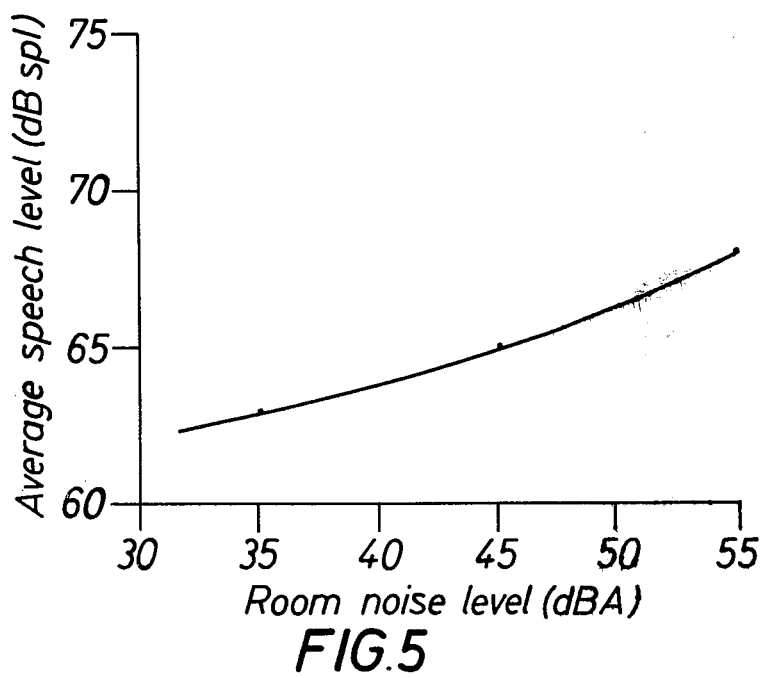
FIG. 5 is a plot of average speech level as a function of room noise level.

The output of the mixer 25 is connected to a filter 32 to restrict the speech spectrum to a level suitable for transmission over telephone lines. A frequency shifter may be provided between the mixer 25 and filter 32 to introduce a 5 Hz shift into the speech spectrum to suppress premature onset of ringing or oscillation associated with room modes. The filter 32 is connected to an attenuator 33. The value of this attenuator and a similar attenuator 45 in the receive circuit is adjusted automatically under the control of the room noise detector 31. The room noise detector is provided to measure the level of room noise present in the terminal and in turn set the value of the attenuators 33, 45 to adjust the ratio of fixed transmit and receive gain to suit the preferred listening level for the terminal. FIGS. 4 and 5 illustrate how typical preferred listening level and measured speech level vary as a function of room noise level and the detector 31 and attenuators 33, 45 are designed to compensate for these variations. The attenuator 33 is connected to a limiter 34 which ensures that the signal transmitted to the telephone line is not too large. The limiter 34 connects to a shallow voice switch 35 which is coupled with a similar circuit 44 in the loudspeaker electronics and is provided to enhance by a few decibels the amplification of the electronics in either the transmit or receive direction depending upon whether the conferees are talking or listening. The switch 35 is connected to a noise reduction unit 36 which is included to alleviate line noise effects and is particularly useful when the terminal is used with a public switched telephone network. The unit 36 can take the form of a 'Dolby' or 'dBX' type processor or may use a specially developed compandor. The noise reduction unit 36 is connected to a line send circuit 37 from which the signals are transmitted via a telephone line 38 to other terminal units at different locations.

The receive part of the electronic control circuit has a receive unit 40 which can receive signals from terminals at other locations via private telephone lines 42. The receive unit 40 is connected to a noise reduction unit 43 which is complementary to the transmit unit 36. The noise reduction unit is connected to the shallow voice switch unit 44 which in turn is connected to the attenuator 45. The attenuator 45 is connected to a filter 46 which is provided to restrict noise components falling outside the speech band from reaching the loudspeaker. The filter 46 is connected to an amplifier 48 which feeds the loudspeaker 10.

The circuit also includes an oscillator 50 and a peak programme meter 51. These can be switched to various parts in the control circuit to assist setting up of the circuit and fault diagnosis.

In an audio teleconferencing system a terminal unit and associated electronic circuitry described with reference to FIGS. 1 to 3 is provided at each location where conferees are situated. The terminal units and associated circuitry are connected by private telephone lines. The conferees at the various locations can converse with each other without having to operate any switches and without any significant feedback problems which are effectively eliminated by using suitably orientated, directionally sensitive microphones.

There are a number of alternative ways in which the electro-acoustic unit can be constructed. These are illustrated in FIGS. 6 to 12. The embodiment of FIG. 6 employs a single cardioid microphone, whilst that shown in FIG. 7 has two bi-directional microphones to extend coverage for long tables. In this case the received speech level must be reduced by 3 dB for each doubling of the number of microphones. In this case the separation of the bi-directional microphones should typically correspond with the width of the table.

For longer tables it may be necessary to increase the number of loudspeakers and an arrangement to meet this situation is shown in FIG. 8. In this arrangement the two loudspeakers are provided at opposite ends of the boom 11 and three or more bi-directional microphones are provided in between. It may be necessary in this arrangement to introduce a small delay, say 10 to 20 milli seconds, into the signal path feeding one loudspeaker since small movements of a conferee seated half-way between the loudspeakers may cause the apparent source of sound to vary from end to end.

FIG. 9 shows an arrangement which effectively consists of two of the units shown in FIG. 1, the loudspeaker of each unit being arranged centrally, back to back. FIG. 10 shows an arrangement consisting of a combination of two different units, one which has a loudspeaker and two bi-directional microphones and the other of which has a loudspeaker and a cardioid microphone.

Figure 11:
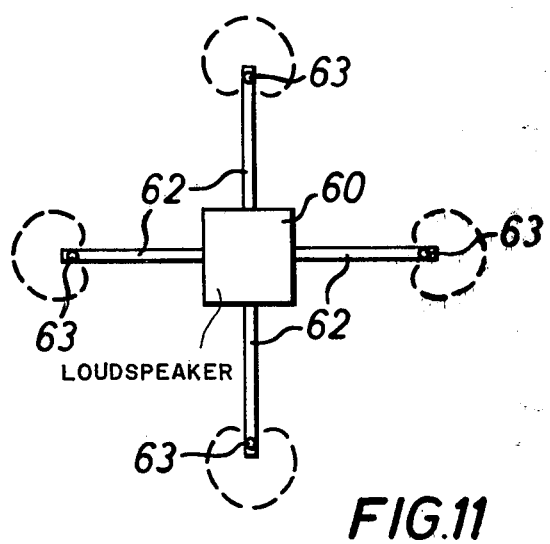

The embodiment shown in FIG. 11 has a centrally located loudspeaker unit 60, each vertical face of which has an electro-acoustic drive unit. A boom 62 extends radially from each vertical face and a cardioid microphone 63 is mounted at the outer end of each boom.

Alternatively the loudspeaker unit 60 can have a single drive unit mounted on its upper face so as to face vertically upwards (or downwards). A suitable reflecting surface is mounted above the loudspeaker unit 60 to reflect the sound towards the conferees. If the loudspeaker faces downwards the sound can be reflected from the surface of the table.

As a further alternative to the arrangement shown in FIG. 11 the microphones can be on booms extending from diagonals of the unit 60. The booms can be integral with or modular additions to the unit 60.

Figure 12:
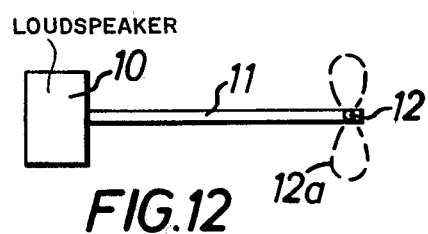

A single loudspeaker and a single figure of eight microphone is illustrated in FIG. 12.

We claim:

1. An electro-acoustic terminal unit for use in an audio teleconferencing system comprising:
   an electro-acoustic transducer,
   one or more acousto-electric transducers, each having a sensitivity which is directionally dependent and exhibits at least one null or substantially null position, the acousto-electric transducer or transducers being horizontally separated from and so located and orientated relative to the electro-acoustic transducer that the null position is directed towards the electro-acoustic transducer, and
   a means for rigidly mounting said transducers to provide said horizontal separation.

2. A terminal unit as claimed in claim 1 wherein said electro-acoustic transducer is a loudspeaker and the or each acousto-electric transducer is a microphone, said mounting means comprising a boom wherein the loudspeaker and microphone or microphones are rigidly mounted to said boom.

3. A terminal unit as claimed in claim 2 wherein said loudspeaker is mounted at one end of said boom and one of said microphone or microphones selected from the group comprising microphones having cardioid and figure-of-eight response curves is mounted at the opposite end of the boom.

4. An electro-acoustic terminal unit for use in an audio teleconferencing system comprising:
   a loudspeaker, and
   a plurality of microphones rigidly mounted to a boom, each microphone having a sensitivity which is directionally dependent and which exhibits at least one null or substantially null position,
   the microphones being so located and orientated relative to the loudspeaker that their null positions are directed towards said loudspeaker,
   said loudspeaker being mounted at one end of said boom, one of said microphones having a cardioid response curve being mounted at the other end of said boom, and one or more others of microphones, each with a figure-of-eight response curve, being mounted on the boom at a position or positions intermediate the loudspeaker and said cardioid microphone.

5. A terminal unit as claimed in claim 4 including a further boom having a loudspeaker mounted at one end thereof, a microphone with a cardioid response curve mounted at the other end, and one or more microphones each with a figure of eight response curve mounted on the boom at a position or positions intermediate the loudspeaker and cardioid microphone, the two loudspeakers being arranged back to back adjacent each other.

6. An electro-acoustic terminal unit for use in an audio teleconferencing system comprising:
   two loudspeakers, mounted one at each end of a boom, and one or more microphones, each having a figure-of-eight sensitivity which is directionally dependent and exhibits two nulls or substantially null positions, the microphone or microphones being mounted on said boom at position(s) intermediate said loudspeakers and so located and orientated relative to the loudspeakers that the null positions are directed towards the loudspeakers.

7. An electro-acoustic terminal unit for use in an audio teleconferencing system comprising:
   a loudspeaker,
   at least two microphones, each of which has a response characteristic which exhibits at least one null or substantially null position, and
   means mounting said loudspeaker and microphones in fixed spaced relationship so that they lie at predetermined horizontally separated spacings such that the null position of each microphone is directed towards the loudspeaker.

8. A terminal unit as claimed in claim 7 wherein:
   said mounting means comprises a boom, said loudspeaker is mounted at one end of the boom, a microphone with a cardioid response curve is mounted at the other end of said boom and a microphone with a figure-of-eight response curve is mounted on the boom intermediate the loudspeaker and said cardioid microphone.

9. A terminal unit as claimed in claim 8 including at least one further figure-of-eight microphone mounted on said boom intermediate the loudspeaker and said cardioid microphone.

10. A terminal unit as claimed in claim 9 including:
a further boom also having a loudspeaker mounted at one end thereof,
a further microphone with a cardioid response curve mounted at the other end of said further boom, and
one or more further microphones, each with a figure-of-eight response curve, mounted on said further boom at a position or positions intermediate the loudspeaker and cardioid microphone also mounted thereon, the loudspeaker of the further boom being arranged back-to-back with the loudspeaker of the first-mentioned boom.

11. A terminal unit as claimed in claim 7 including:
a second loudspeaker, said loudspeakers being mounted one at each end of a boom, and
at least one of said microphones, each with a figure-of-eight response mounted on the boom at positions intermediate the loudspeakers.

12. A terminal unit as claimed in claim 7 including electronic control circuitry for feeding signals to and from two telephone lines to provide a 4-wire circuit.

13. A terminal unit as claimed in claim 12 wherein the control circuitry includes a transmit channel for transmitting signals from the or each microphone to one telephone line and a receive channel for feeding signals from another telephone line to the loudspeaker.

14. A terminal unit as claimed in claim 13 wherein the or each said channel includes an attenuator whose gain is controlled in accordance with the ambient noise level sensed in the vicinity of the terminal equipment.

15. An electro-acoustic terminal unit for use in an audio teleconferencing system comprising:
a loudspeaker,
a plurality of booms, and
a plurality of microphones, each having a sensitivity which is directionally dependent and which exhibits a cardioid response having at least one null or substantially null position,
each microphone being mounted on the end of a respectively associated boom extending radially from the loudspeaker and located and orientated relative to the loudspeaker such that the null position is directed towards the loudspeaker.

16. A terminal unit as claimed in any of claims 2, 3, 12, 13 or 15 including electronic control circuitry for feeding signals to and from two telephone lines to provide a 4-wire circuit.

17. A terminal unit as claimed in claim 16 wherein the control circuitry includes a transmit channel for transmitting signals from each microphone to one telephone line and a receive channel for feeding signals from the other telephone line to the loudspeaker.

18. A terminal unit as claimed in claim 17 wherein the or each channel includes an attenuator whose gain is controlled in accordance with the room noise level sensed in the vicinity of the terminal equipment.

19. An audio teleconferencing system comprising a terminal unit as claimed in claim 16, at a first location linked to another terminal at a second location by a private telephone line.

* * * * *